US005147268A

United States Patent [19]

Cermeno

[11] Patent Number: 5,147,268

[45] Date of Patent: Sep. 15, 1992

[54] FOLDING BOX GLUING MACHINE FOR PACKAGE PRODUCTION PROVIDED WITH SAFETY AND NOISE PROTECTION WALLS

[75] Inventor: César C. Cermeno, Chavannes, Switzerland

[73] Assignee: Bobst SA, Switzerland

[21] Appl. No.: 683,883

[22] Filed: Apr. 11, 1991

[30] Foreign Application Priority Data

Apr. 12, 1990 [CH] Switzerland ........................ 01275/90

[51] Int. Cl.[5] ........................... B31B 5/26; B31B 5/62; F16P 3/08

[52] U.S. Cl. ........................................ 493/38; 493/27; 493/477; 29/DIG. 56; 74/612; 192/135; 408/67; 409/134

[58] Field of Search .................... 29/DIG. 56; 74/612; 192/135; 408/67; 409/134; 493/1, 27, 30, 34, 38, 122, 127, 128, 147, 151, 178, 179, 477, 480

[56] References Cited

U.S. PATENT DOCUMENTS

| | | | |
|---|---|---|---|
| 1,913,304 | 6/1933 | Brackett et al. | 192/135 |
| 1,987,562 | 1/1935 | Moss | 192/135 |
| 4,226,322 | 10/1980 | Peris | 192/135 |
| 4,498,567 | 2/1985 | Aultz et al. | 493/38 |
| 4,597,698 | 7/1986 | Liebtrau | 409/134 |
| 4,604,083 | 8/1986 | Barny et al. | 493/34 |
| 4,618,342 | 10/1986 | Borel | 493/477 |
| 4,765,093 | 8/1988 | Edwards | 49/197 |
| 4,968,292 | 11/1990 | Takeda | 493/477 |

FOREIGN PATENT DOCUMENTS

| | | |
|---|---|---|
| 3615978 | 11/1986 | Fed. Rep. of Germany . |
| 3635900 | 5/1988 | Fed. Rep. of Germany . |
| 2530992 | 2/1984 | France . |

OTHER PUBLICATIONS

Neue Verpackung vol. 36 No. 10, 1983, pp. 1283–1286, Heidelberg, DE; "Neue Branchenunabnangige Kartoniermaschinen".

*Primary Examiner*—William E. Terrell
*Attorney, Agent, or Firm*—Hill, Van Santen, Steadman & Simpson

[57] ABSTRACT

A folding box gluing machine to be used for the production of packages is provided with a lateral wall situated on the operator's side of the machine which consists of a plate making up the machine frame. The plate has several apertures providing access to, and inspection of, the inner machine area. The full or closed areas of the plate are covered up by hollow panels in which the machine components can be lodged. The apertures are closed by transparent panels which are removable and are provided with safety detectors preventing the machine operation as long as they are not closed. The height of the panels is sufficiently high so that the wall will be able to ensure a noise absorbing or blocking effect.

6 Claims, 4 Drawing Sheets

FOLDING BOX GLUING MACHINE FOR PACKAGE PRODUCTION PROVIDED WITH SAFETY AND NOISE PROTECTION WALLS

BACKGROUND OF THE INVENTION

The present invention relates to a folding and gluing machine designed for package production.

Such a machine is used to make of a blank, previously produced by means of a cutting and creasing press, a flat folded box which, subsequently, i.e. when it is going to be utilized, will only have to be set up to its final shape. To this aim and as illustrated by a showing of the prior art in FIG. 1 of the attached drawings, such a machine is to comprise, for instance:

a feeding section A destined to take up the blanks or sheets F batchwise and to center the sheets successively as they are individually taken from the batch with regard to the central axis of the machine;

a prefolding section B;

a gluing section C;

a folding section D; and a delivery section E.

FIG. 1 of the attached drawing shows schematically, the successive stages of a sheet F as it travels through the sections A to E.

As the present invention has no direct relationship with the means used for the processing of the sheet F in the various sections A to E, these means have been left away from FIG. 1, the folding and gluing machine being thus represented only by its lateral walls situated on the operator's side and opposite.

The recent development of such machines has more and more brought about the adoption of walls on the operator's side for arranging or integrating increasingly complicated and cumbersome means for automatization and control of the numerous operations mentioned above. For this reason, these walls are made of a plate $P_1$ of relatively great thickness making up the inner side, i.e. the one situated on the machine's side, of the wall and extending throughout the whole machine length which may reach up to 25 m. This plate $P_1$, jointly used with an identical plate $P_2$ situated on the side opposite the operator's, makes up the machine frame. The maximum height of these plates up to now has been limited to about 1.50 m so as to enable the machine operator to watch the machine throughout its width by looking over the top of the plates. For rendering the inspection even easier, the plate $P_1$ is provided with rectangular apertures $O_1$ to $O_6$ generally open upwardly and configuring among themselves the full parts designated as vertical supports. A lower edge of the apertures $O_1$ to $O_6$ is situated at about 80 cm from the floor in order to prevent or obstruct the access to the inner machine area for safety reasons. The entire outer side of the plate $P_1$ is covered up with numerous hollow panels or coffers $E_1$ to $E_9$ of various sizes. These hollow panels $E_1$ to $E_9$ shaped so as to enclose the periphery of the plate $P_1$, make up with the plate $P_1$ a kind of cabinet allowing to house therein mechanical, electric and electronic drive transmission and/or control devices of the machine. Such a wall as situated on the operator's side according to prior art has, however, essentially two drawbacks, i.e.:

it encumbers the accessibility to the inner machine area notwithstanding the fact that the operator is frequently compelled to reach in for manually checking and setting processing operations, and it has no noise absorbing effect, i.e. it does not prevent the emission of noise produced by the machine in operation.

Attention should also be drawn to the fact that at a prior stage, the proposition has been put forth with a view to complying with safety requirements to equip such a machine with a detecting devices provided with light beam emitters/receivers, or else with belts including detectors arranged all along the machine for detecting any accidental or non-accidental penetration of a human being in the inner machine area and for stopping the latter automatically. Moreover, in addition to excessively quick wear and tear of the belt and excessive of the light beam detectors to dust, these detecting devices also have the drawback of too easily causing uncontrolled machine stops, i.e. when there is no necessity whatsoever, and thereby causing a drop in production. In addition, there is no noise absorbing or reducing effect offered by the panels or frame of the machine.

SUMMARY OF THE INVENTION

An object of the present invention is to allow the realization of a folder-gluer of which at least the wall on the operator's side:

encumbers as little as possible the inspection of the inner machine area at stand-still or while operating, obstructs as little as possible the accessibility to the inner machine area during its operation, significantly reduces the machine noise to which the operator is exposed.

This object is achieved by the provision of a folding box gluing machine of the type described above which is provided with two lateral walls, one on an operator's side and one on an opposite side from an operator. The operator's side wall has a first part extending throughout a whole length of the machine, thus making up the machine's frame. The first part is provided with several apertures for access to and survey of an inner machine area between the two lateral walls. The first part of the first wall, except in the area of the apertures, is covered on an outer side by a second part comprising hollow panels win which can be arranged various control and drive devices of the machine. A lower edge of the apertures are situated at a height above the floor to ensure appropriate accessibility to the inner machine area. The apertures are closed by transparent panels movable between a first complete closing position and a second position in which the panels allow an access to the inner machine area. The panels are provided with detection devices which, acting jointly with the machine control, prevent operation of the machine when the panels are not in the complete closing position. The hollow panels, as well as the transparent panels, have a sufficient height such that the lateral wall will act as a noise protection screen.

BRIEF DESCRIPTION OF THE DRAWINGS

Further features and advantages of the invention will be put forth in the description hereafter of a way of realization with reference to the attached drawings in which.

DESCRIPTION OF THE PREFERRED EMBODIMENTS

Figure 1:
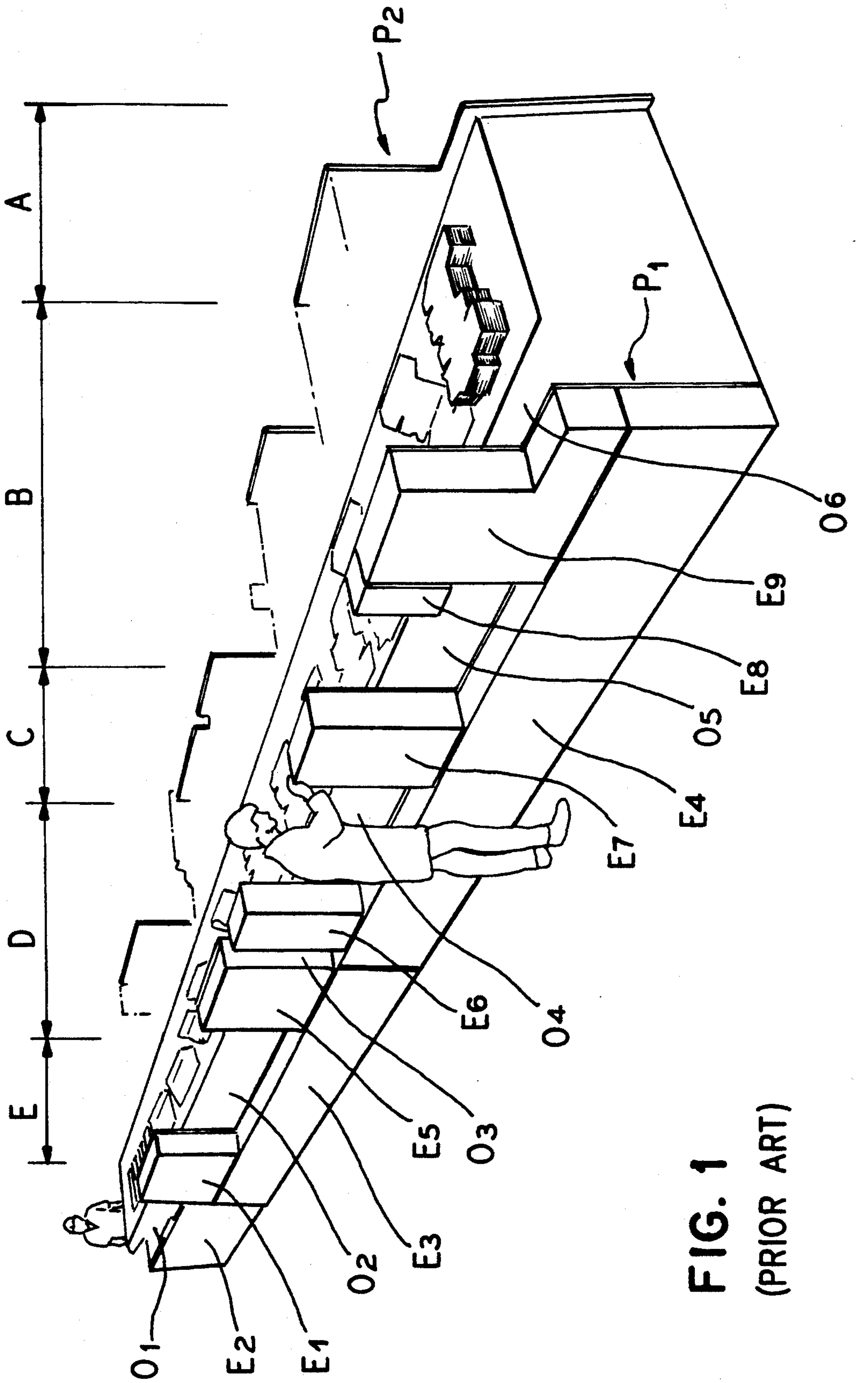
FIG. 1 (PRIOR ART)
FIG. 1 is a simplified view of a machine according to prior art.

FIG. 1 is a view of a folder-gluer according to prior art, illustrating only the two lateral walls, i.e. the wall of the operator's side consisting of a plate $P_1$ and several coffers or hollow panels $E_1$ to $E_9$, and the wall on the side opposite the operator's consisting of a plate $P_2$. As already mentioned above, the two plates $P_1$ and $P_2$ make up the machine frame properly speaking. The machine components situated between the two lateral plates $P_1$ and $P_2$, and destined for the various operations to be carried out on successive blanks or sheets F originating from the batch loaded into the feeding section A, have been replaced with a white-on-black visualization of the successive folding stages of a sheet F as it travels through the sections A to E described above. The processing means of such a machine are sufficiently known in the art, thereby obviating the need for a more detailed description.

Figure 2:
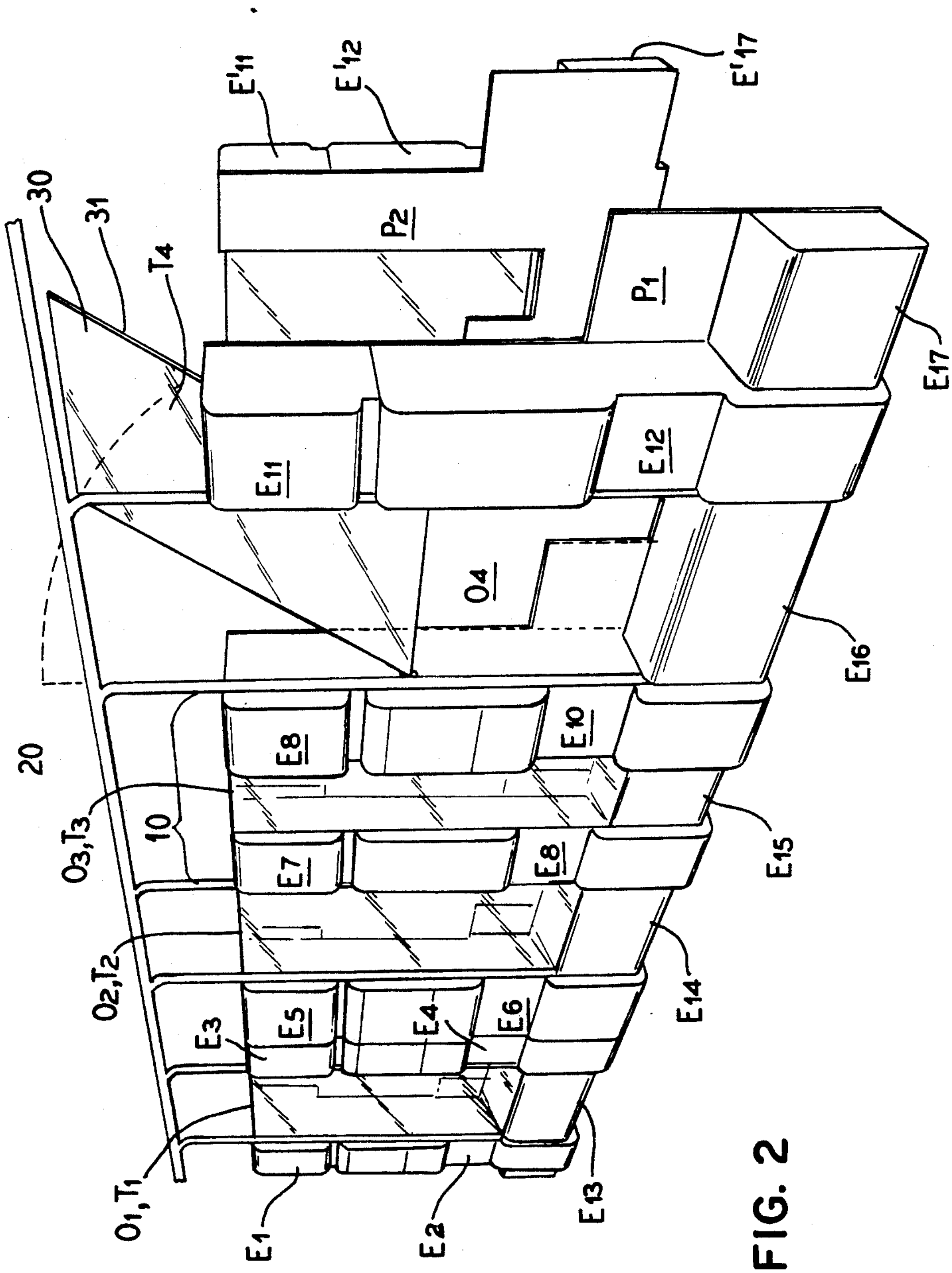
FIG. 2 is a view of a machine according to the invention.

FIG. 2 shows a machine according to the invention, and also illustrates solely the two lateral walls, it being understood that all necessary blank feeding, folding, gluing and delivery devices are located between them. On FIG. 2, identical reference letters and numerals have also been used for the devices and components similar to those of FIG. 1.

The wall on the operator's side includes an inner plate $P_1$ which can consist of one, or several, contiguous parts. The plate $P_1$ extending throughout the length of the machine reaches from floor level a height allowing to subdue the noise (as will be explained further on), for instance about 2 m. The plate $P_1$ is provided with several rectangular apertures $O_1$ to $O_4$ situated with a lower edge at a maximum height of about 50 cm above floor level, i.e. at a height such as to enable the plate $P_1$ in that area to be stepped over without difficulty by the operator desirous of getting in the inner machine area.

The outer side of the plate $P_1$ supports numerous rectangular hollow panels or coffers $E_1$ to $E_{17}$ extending over the full vertical areas of the plate $P_1$. Certain panels, i.e. $E_1$ $E_5$, $E_6$, $E_7$, $E_9$, of which the longest side is arranged in vertical direction correspond to every full vertical area, or vertical support, of the plate $P_1$, i.e. to an area situated on either side of the apertures $O_1$ to $O_5$. In these areas, it is imaginable that the whole height of the plate $P_1$ is occupied by a single hollow panel or by two panels $E_{11}$, $E_{12}$ vertically contiguous as shown by FIG. 2. Thus on a single support area between two apertures, it is possible to envisage two laterally contiguous panels $E_3$ and $E_5$, or else $E_4$ and $E_6$. Preferably the height of the lower panel $E_{12}$ should be larger than the height of the lower panel $E_{11}$. Horizontal panels $E_{13}$ and $E_{17}$ situated underneath every aperture $O_1$ and $O_5$ have a lesser thickness than the vertical panels $E_1$ to $E_{12}$ thus reducing or removing the need for the operator to make excessive steps when desiring to gain access to the actual inner machine area. For reducing the costs involved with the serial manufacture of the panels $E_1$ to $E_{17}$, it is appropriate to adopt a lay-out, a shape and dimensions for the apertures $O_1$ to $O_4$ and for the panels $E_1$ to $E_{17}$, providing a maximum of identical panels. However, attention is to be drawn to the fact that the site and the width of the full vertical parts of the plates $P_1$ and $P_2$ are determined essentially by their purpose of acting as frames as conferred to them by the machine conception.

As a matter of fact, when conceiving the machine, the designers are to give consideration to the future arrangement of the vertical panels $E_1$ to $E_{12}$ from which ensues the fact that all driving and transmission means are to be designed and arranged so as to be lodged within the vertical panels meeting within the following criteria requiring them:

- Not to be too numerous,
- To be sufficiently distanced from one another so as to provide passage for the operator,
- Not to be too broad so as to provide adequate visibility between stations, and
- To be situated so as to provide free view into the inner area of the machine where this is particularly necessary.

In order to prevent access to the inner area of the machine and to reduce the level of machine noise to which the operator is exposed, the apertures $O_1$ to $O_4$ are closed by the transparent panels $T_1$ to $T_4$, each panel consisting of a transparent plate 30 fitted on a steel frame 31. Generally, every aperture $O_1$ to $O_4$ corresponds to a single piece of the transparent panel $T_1$ to $T_4$. Every one of the panels $T_1$ to $T_4$ is shiftable between a first position in which the corresponding aperture $O_1$ to $O_4$ is completely shut by one of the panels $T_1$ to $T_4$, and a second position in which the apertures $O_1$ to $O_4$ are no longer shut by the panels $T_1$ to $T_4$, so as to enable access to the inner machine area. To this aim, the panels $T_1$, $T_2$, $T_4$, which are of large dimensions, are shiftable vertically and simultaneously pivotable around a horizontal axle or axis, preferably towards the machine as shown by the dotted lines representing the panel $T_4$ of FIG. 2. The shifting of the large panels $T_1$, $T_2$, $T_4$ can be automatized if desired.

On the other hand, the panel $T_3$, which is of a small lateral dimension, can be opened to the outside in the same way as a door and it thus pivotable around a vertical axle or axis by means of hinges connecting the panel $T_3$ to the auxiliary vertical supports 10, themselves fitted on the hollow panels $E_7$ to $E_9$ and situated on either side of the apertures $O_1$ to $O_4$. Some of the auxiliary supports 10 exceed the height of the lateral wall and are provided at their upper end with a lateral rail 20 extending throughout the length of the machine and allowing the shifting of the carriage or of a mobile box 25 on which is fitted a movable control unit 27 of the machine.

Figures 3, 6:
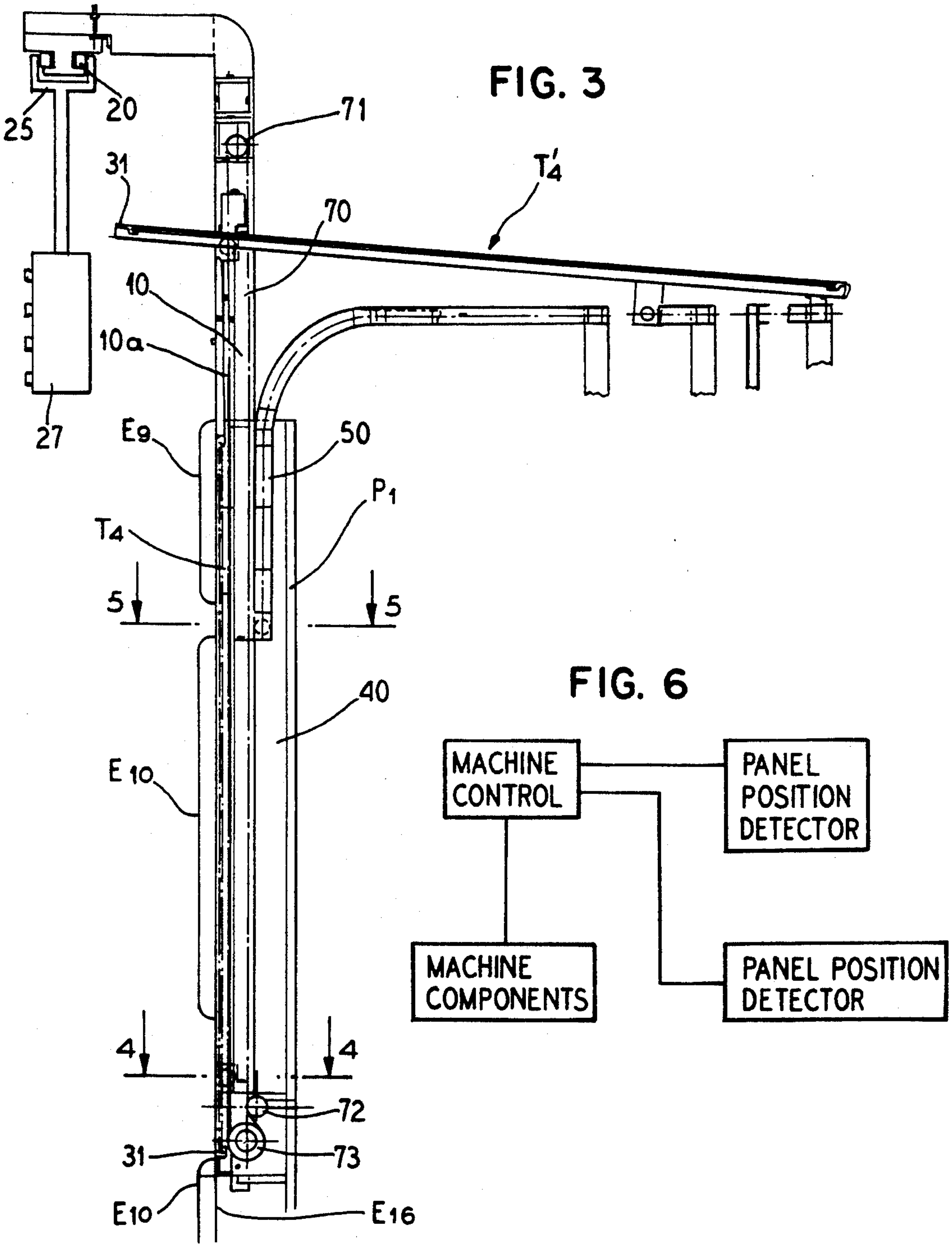
FIG. 3 is a partial sectional view of a lateral wall of the machine.
FIG. 6 is a schematic block diagram of a portion of the machine control.

FIG. 3 is a partial crosswise view of the machine along the auxiliary support 10 on which are fitted the means for supporting, guiding, and shifting of the panel $T_4$.

Figure 4:
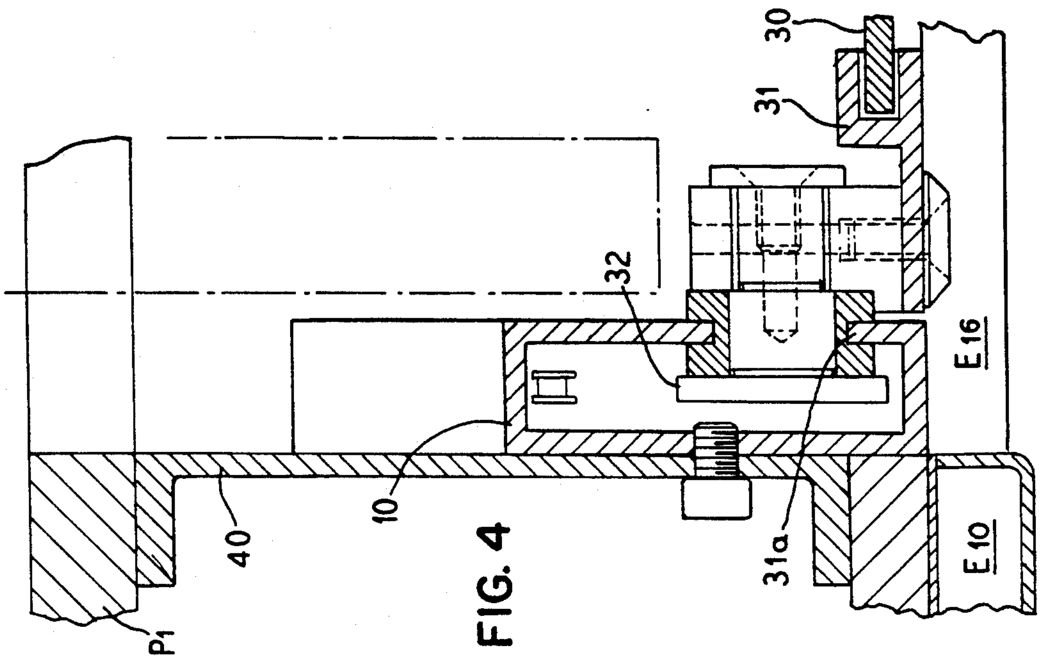
FIGS. 4 and 5 are sectional views according to 4—4 and 5—5 of FIG. 3.
Figure 5:
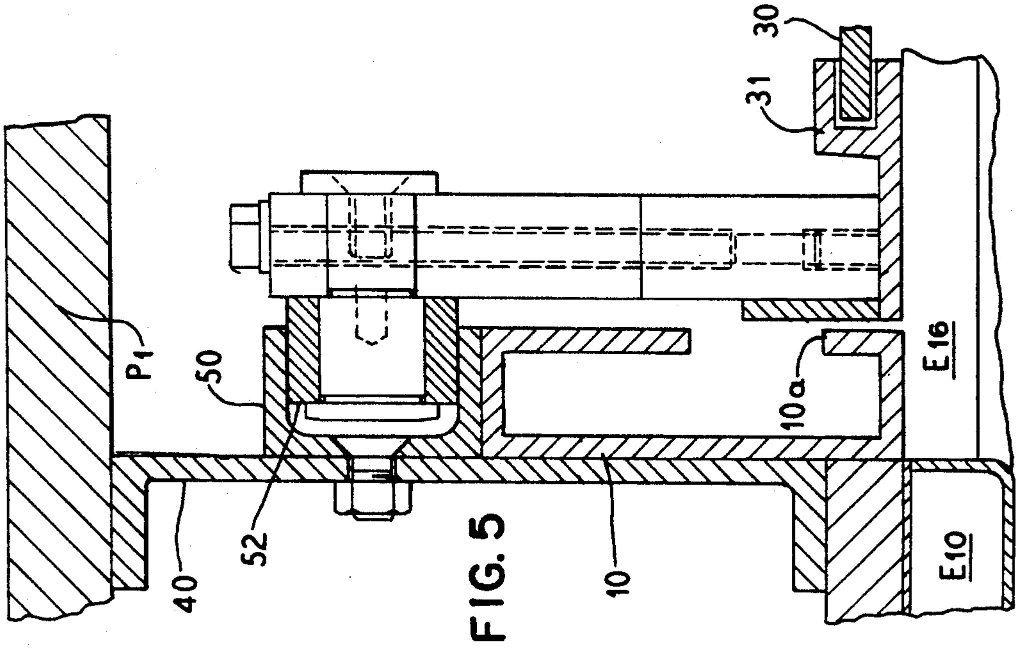

The support 10 is a hollow profiled piece fitted on another vertical profiled piece 40, itself fitted on the plate $P_1$ (see FIG. 4) and acting as part of the adjacent hollow panel $E_{10}$. The support 10 is provided with a vertical guiding groove 10*a* engaged with a sliding shoe 31*a* fitted on the lower end of the frame 31. In the vicinity of the upper end of the hollow panel $E_9$, a second profiled guiding piece 50 is fitted on the profiled piece 40 and allows a second sliding shoe 52 fitted on the upper end of the frame 31 to slide therein. The second profiled guiding piece 50 includes a first vertical lower and a second upper part, the latter being bent more or less horizontally so that when the panel $T_4$ is shifted upward, it pivots progressively around the horizontal axle of the shoe 31*a* towards the inner machine area. In order to enable the panel $T_4$ to be shifted, the lower shoe 31*a* is connected with a little plate 32 to a chain 70 which is guided by the pulleys 71, 72 and 73 along the support 10 in such a way as to describe a vertically closed loop. FIG. 3 shows that the rotary forward and backward drive of the pulley 73 ensured by a motor (not represented) causes the upward or downward shift of the sliding shoe 31*a* and, consequently, the opening or closing of the panel $T_4$ under the joint action of the guides 10*a*, 50 and the sliding shoes 31*a*, 52. Preferably, the panel $T_4$ is also provided with such guiding and shifting means along its second lateral edge.

Such means for automatic opening and closing of the movable panels are sufficiently known in the art, dispensing thus with the need for more detailed description. It may therefore be sufficient to refer to the numerous systems used, for instance, for actuating garage doors.

The panel $T_3$, which is of small dimensions, is fitted on the supports 10 by means of the hinges (not represented).

In order to enable the panels $T_1$ to $T_4$ to prohibit the access to the inner machine area, the panels $T_1$ to $T_4$ are provided with detectors acting jointly with the machine control so as to enable the operation or the start-up of the latter only in case all panels $T_1$ to $T_4$ are really closed. Such detectors, as well as the various possibilities involved with their location and way of action, are sufficiently known dispensing thus from further detailed description. In this connection, consideration should be given to the fact that such detectors can also be linked for joint action with every motor for opening and closing of the panels $T_1$, $T_2$, $T_4$, it being thus sufficient to start up one of these motors in the direction for opening a panel $T_1$, $T_2$, $T_4$ in order to prevent or stop the operation of the machine.

On the side opposite the operator's, a wall similar to the one described above can also be envisaged if necessary; in the contrary case, this wall may consist only of the plate $P_2$ making up the corresponding lateral frame.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A folding box gluing machine for production of a box from a sheetlike blank in response to a machine control, comprising:

at least a feeding, a gluing, a folding and a delivery section for transforming said blank into a box, two lateral walls, one situated on an operator's side and one on an opposite side from an operator, wherein said operator's wall has a first part extending throughout a whole length of said machine, thus forming a frame for said machine, said first part being provided with several apertures defined by upper, lower and lateral edges for access to and survey of an inner machine area, said first part, with the exception of said apertures, being covered on an outer side by a second part comprising hollow panels at least some of said hollow panels receiving various control and drive devices of the machine, said lower edge of said apertures being situated with regard to a floor, at an adequate height ensuring appropriate accessibility to said inner machine area, said apertures being closed by transparent panels pivotally movable between a first complete closing position of said apertures and a second position in which said panels allow an access to said inner machine area, at least some of said transparent panels are pivotable about a horizontal axle, said horizontal axle being situated at a lower end of said panel and guiding means being provided at an upper end of said panel engageable with guiding means on said wall to ensure a guiding of an upper end of said panel as said upper end is moved upwardly and inwardly, detection means for said panels which, acting jointly with said machine control, prevent the operation of said machine when said panels are not situated in said closing position, and said hollow panels, as well as said transparent panels, having a height sufficient to allow said lateral wall to act as a noise protection screen.

2. A machine according to claim 1, wherein at least some of said transparent panels are pivotable around a vertical axle

3. A machine according to claim 1, wherein said lower edge of said aperture is situated no more than 50 cm above said floor.

4. A machine according to claim 1, wherein said hollow panels and said transparent panels have a height no less than 2 m.

5. A machine according to claim 1, wherein an automated motor drive is operably connected to said transparent panels pivotable about a horizontal axle in order to lift an upper end of said panels upwardly and inwardly.

6. A folding box gluing machine for production of a box from a sheetlike blank in response to a machine control, comprising:

at least a feeding, a gluing, a folding and a delivery section for transforming said blank into a box, two lateral walls, one situated on an operator's side and one on an opposite side from an operator, wherein said operator's wall has a first part extending throughout a whole length of said machine, thus forming a frame for said machine, said first part being provided with several apertures defined by upper, lower and lateral edges for access to and survey of an inner machine area, said first part, with the exception of said apertures, being covered on an outer side by a second part comprising hollow panels, at least some of said hollow panels receiving various control and drive devices of the machine, said lower edge of said apertures being situated with regard to a floor, at an adequate height ensuring appropriate accessibility to said inner machine area, said apertures being closed by transparent panels pivotally movable between a first complete closing position of said apertures and a second position in which said panels allow an access to said inner machine area, detection means for said panels which, acting jointly with said machine control, prevent the operation of said machine when said panels are not situated in said closing position, a mobile machine control board, a carriage for supporting said control board, a lateral guiding rail situated above said wall as a support for said carriage, said wall including vertical supports on either lateral side of said apertures for supporting said guide rail, and said transparent panels comprising a transparent plate and a frame removable from said vertical supports, and said hollow panels, as well as said transparent panels, having a height sufficient to allow said lateral wall to act as a noise protection screen.

* * * * *